United States Patent
Wimbauer

[11] Patent Number: 5,762,984
[45] Date of Patent: Jun. 9, 1998

[54] APPARATUS FOR INJECTION MOLDING PLASTIC MATERIAL

[75] Inventor: Gerhard Wimbauer, Schwertberg, Austria

[73] Assignee: Engel Maschinenbau Gesellschaft m.b.H., Schwertberg, Austria

[21] Appl. No.: 680,131

[22] Filed: Jul. 15, 1996

[30] Foreign Application Priority Data

Jul. 19, 1995 [AT] Austria .................. GM 397/95

[51] Int. Cl.$^6$ ........................................... B29C 45/64
[52] U.S. Cl. ................ 425/589; 100/258 A; 425/450.1; 425/451.9; 425/595
[58] Field of Search ................ 425/589, 595, 425/450.1, 451.9; 100/258 A

[56] References Cited

U.S. PATENT DOCUMENTS

| | | | |
|---|---|---|---|
| 5,249,951 | 10/1993 | Leonhartsberger et al. | 425/589 |
| 5,354,196 | 10/1994 | Ziv.-Av | 425/450.1 |
| 5,478,231 | 12/1995 | Hehl | 425/589 |
| 5,538,415 | 7/1996 | Reinhart et al. | 425/589 |
| 5,556,656 | 9/1996 | Lampl et al. | 425/589 |
| 5,633,024 | 5/1997 | Ziv-Av | 425/595 |

*Primary Examiner*—James P. Mackey
*Attorney, Agent, or Firm*—Notaro & Michalos PC

[57] ABSTRACT

Apparatus for injection molding plastic material has a stationary and a movable mold mounting plate which each fixes a respective mold half and thus establishes a horizontal central plane (Z) of the mold. At least one mold mounting plate (8, 2) is pivotable relative to the machine frame (1) about a centrally arranged horizontal axis (15, 15'), and rotary pivots (5, 5') forming a horizontal pivot axis of the mold mounting plate is displaced upwardly relative to the horizontal central plane (Z) of the mold.

3 Claims, 5 Drawing Sheets

APPARATUS FOR INJECTION MOLDING PLASTIC MATERIAL

FIELD AND BACKGROUND OF THE INVENTION

The invention concerns an apparatus for injection molding plastic material comprising a stationary and a movable mold mounting plate which have means for fixing a respective mold half and thus for establishing the horizontal central plane of the mold, wherein at least one mold mounting plate is pivotable relative to the machine frame about a centrally arranged horizontal axis.

In recent times a number of apparatuses of that kind have been proposed (see for example DE 92 12 480U). In that respect, the aim of the pivotable mounting of at least one of the mold mounting plates is to make the orientation of that plate independent of deformation or the associated vertical limb of the machine frame structure, as can otherwise occur in the case of machines which do not have frame members. If each mold mounting plate has a pivot, then when the closing pressure is applied the two mold mounting plates and the mold halves which are secured thereto retain their orientation in space. A particularly simple structure is shown in EP 311 133 B2 in which only the movable mold mounting plate is mounted in such a way as to be tiltable. In that case plate parallelism is achieved by virtue of the fact that the movable mold mounting plate also performs the pivotal movement of the stationary mold mounting plate. Therefore the angle through which the rotary pivot pivots corresponds to the sum of the pivot movements of the two vertical limbs of the machine frame.

Movement of the respectively provided rotary pivots is effected, after closure of the mold, in accordance with the deformation of the machine frame, which is caused by the closing force. In that case, a moment must be applied to the pivot by the plate which is secured to the pivot, in order to overcome the mounting friction.

Horizontal pivotability of the mold plate does not have to be made possible by virtue of a two-part rotary pivot; an elastically deformable member between the mold plate and the machine frame can also permit the mold plate to pivot.

SUMMARY OF THE INVENTION

The object of the present invention is to provide a defined torque for pivotal movement of the mold plate. That is achieved in that the means forming the horizontal pivot axis of the mold mounting plate is displaced upwardly relative to the horizontal central plane of the mold. The amount by which the pivot axis is displaced is slight, the axis remains in the central region. If the pivotal movement is produced by means of a rotary pivot comprising a pivot bush and a pivot pin, it usually happens that the axis of the pivot extends at a spacing above the horizontal central plane of the mold, which is smaller than half the radius of the pivot. Even if deformable members are used to permit the pivotal movement of the mold plate, the horizontal central plane of the mold, in the case of apparatuses according to the invention, extends through the deformable member.

The particular advantage of the invention is that a torque for pivotal movement of the mold plate is produced although the closing force is centrally applied to the mold and the reaction force exerted by the mold also remains in the central plane of the mold.

BRIEF DESCRIPTION OF THE DRAWINGS

Further details of the invention are described hereinafter with reference to the drawings in which.

DESCRIPTION OF THE PREFERRED EMBODIMENTS

Figure 1:
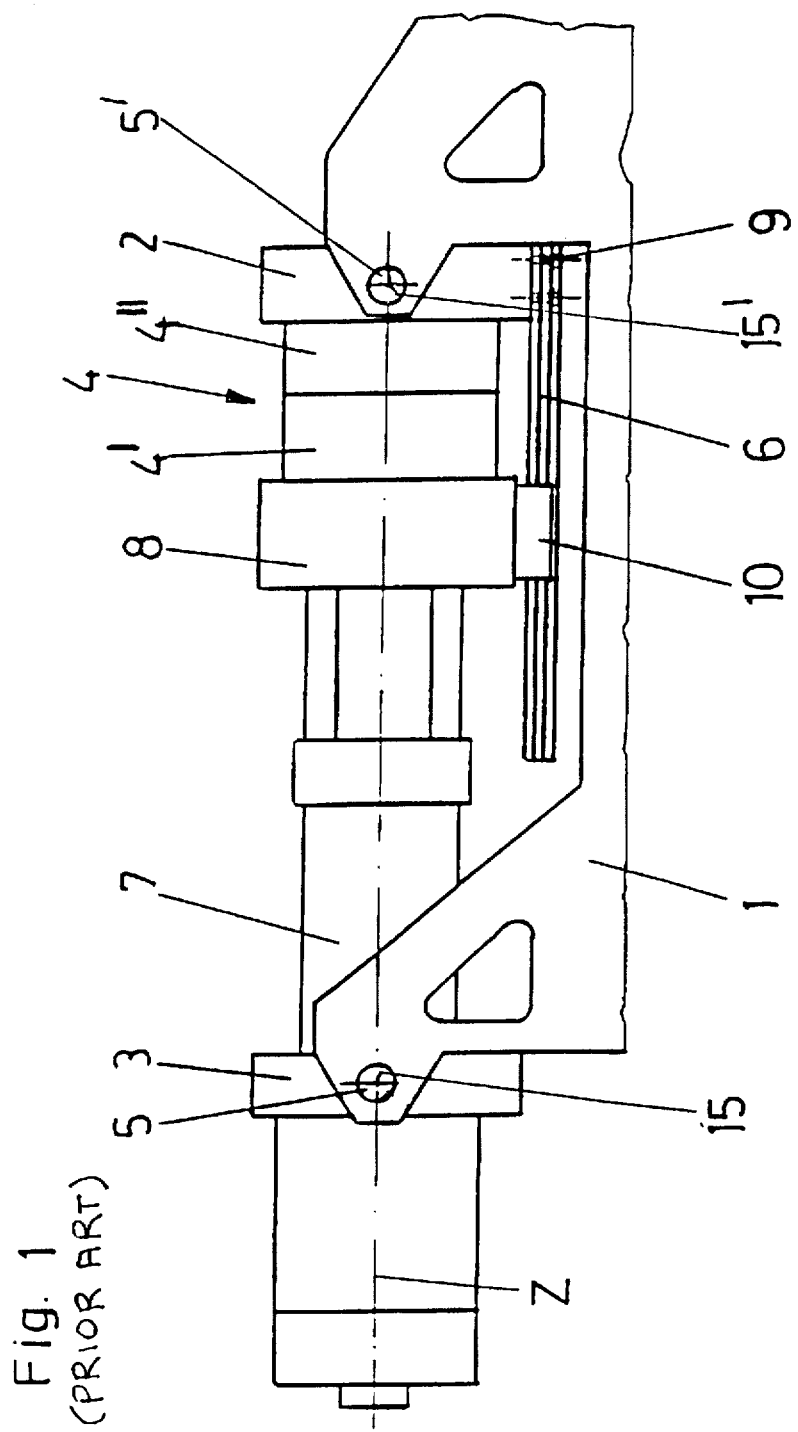
FIG. 1 shows the structure of a known injection molding machine with two pivots.

An essential part of the injection molding machine illustrated in FIG. 1 is the machine frame 1 which stationarily carries the mold mounting plate 2 and the cylinder plate 3. In other words the stationary mold mounting plate 2 and the cylinder plate 3 are mounted on the machine frame 1 rotatably about horizontal axes on rotary pivots 5' and 5.

The stationary mold mounting plate 2 and the movable mold mounting plate 8 carry the mold 4 which comprises the mold halves 4', 4".

The injection unit with the feed hopper is arranged at the rear side of the stationary mold mounting plate 2. The injection unit and the feed hopper however are not shown in the drawings. They are not subject-matter of the invention and are produced in accordance with the state of the art.

The cylinder plate 3 carries a piston-cylinder unit 7 which in turn carries the movable mold mounting plate 8 and which forms the mechanism for holding the mold closed.

The movable mold mounting plate 8 is urged toward the right during the injection procedure by means of the piston-cylinder unit 7 and the mold is thereby held closed against the internal pressure in the mold.

In the case of a closing unit in which the closing force is transmitted exclusively by way of the frame 1, without frame beam members, the arrangement could be caused to gape open in the upper region of the tool. Therefore, provided at the cylinder of the piston-cylinder unit 7 is a rotary pivot 5 forming a horizontal axis 15. The stationary mold mounting plate 2 is also mounted on the machine frame 1 tiltably about a horizontal axis 15' by means of a rotary pivot 5'. The tiltability of the end plate 3 and the mold mounting palates 2, 8 ensures that, when a high closing force is applied, the mold half 4' carried by the movable mold mounting plate 8 can bear in parallel relationship against the mold half 4" carried by the stationary mold mounting plate 2.

A guide rail 6 is directly secured by means of screws 9 to the stationary mold mounting plate 2. The guide rail 6 therefore also performs a tilting movement of the stationary mold mounting plate 2.

The movable mold mounting plate 8 is provided with a slide shoe 10 which embraces the guide rail 6 in positively locking relationship therewith and is guided thereon, being prevented from lifting off same in a vertical direction.

Figure 2:
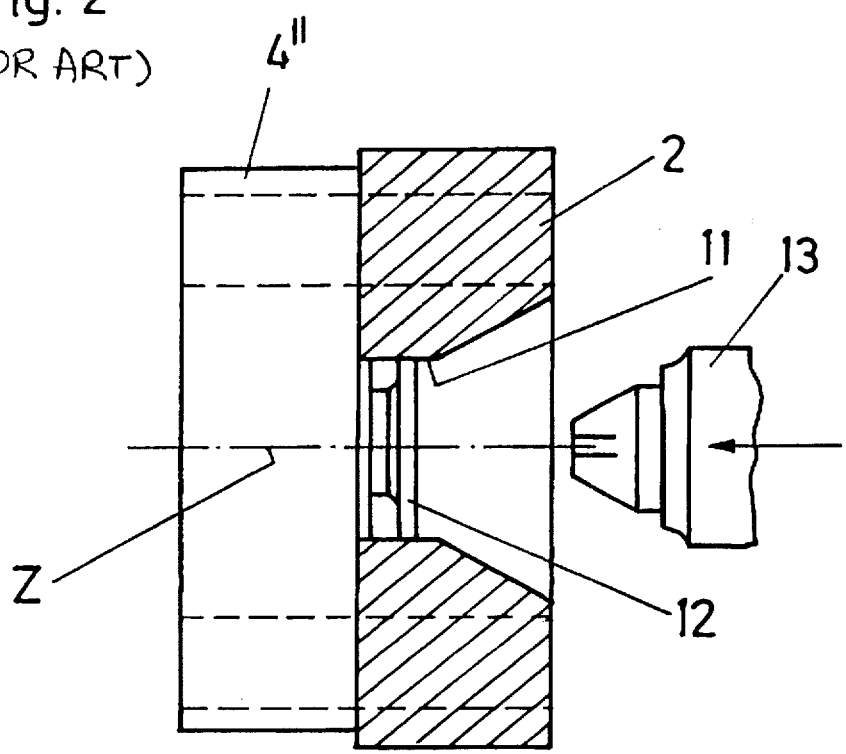
FIG. 2 shows a conventional option for fixing a mold half to a mold mounting plate.

The mold halves 4', 4" are each fixed to the respective mold mounting plate 8, 2 at the same location. The most widely varying structures are known for centering the mold halves 4', 4". For example FIG. 2 shows an arrangement in which a projection 12 of the mold half 4" projects into an opening 11 in the mild mounting plate 2 where it can be braced by laterally inserted wedge keys. The ensures accurate alignment relative to the stationarily mounted injection unit 13 which opens at the level of the horizontal central plane Z of the mold.

Figure 3:
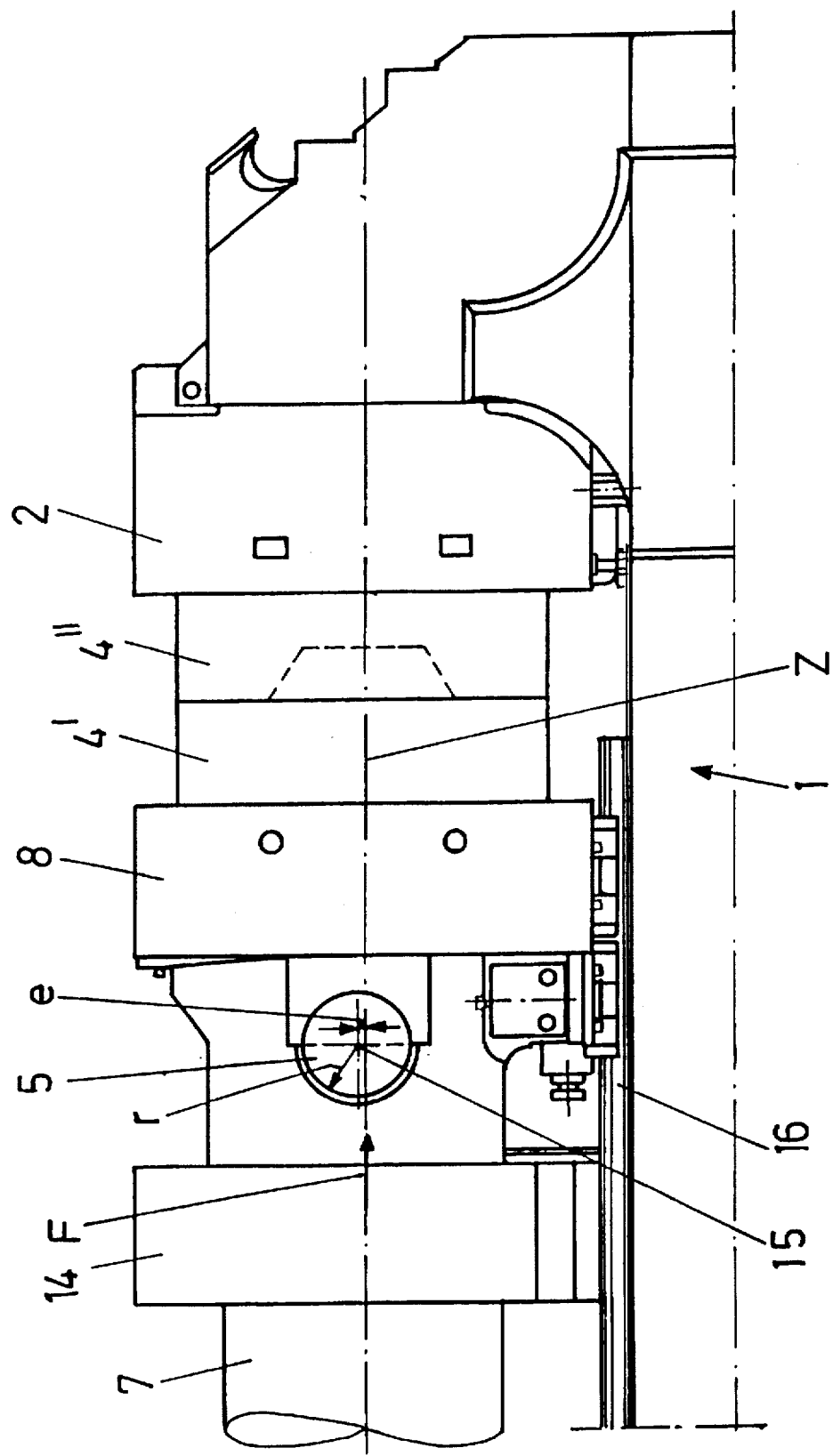
FIG. 3 is a diagrammatic view of part of a machine with only one rotary pivot.

As mentioned satisfactory functioning of the rotary pivot 5 is a matter of significance in particular in relation to single-pivot machines because it is in those machines that the largest pivotal movement occurs. The invention is therefore described in greater detail with reference to such a machine as is shown in FIG. 3.

In this apparatus the rotary pivot 5 is arranged between the mold mounting plate 8 movable on the rail 16, and the ejector plate 14. The closing force F is applied by way of the piston 7.

Under the influence of the closing force F, a frictional moment $\mu.F.r$ occurs in the pivot 5 whose pivot gap is at a spacing r from the pivot axis 15, wherein $\mu$ is the coefficient of friction of the pair of surfaces which are pressed against each other. The construction according to the invention seeks to produce a torque which overcomes that frictional moment without deformation of the mold. For that purpose the pivot 5 is displaced upwardly by the amount e relative to the horizontal central plane z on to which the mold halves 4', 4" are centered and relative to the line of action of the closing force F. The moment produced thereby is e.F so that the frictional moment of the rotary pivot 5 is only overcome by the proposed structural measure when $e=\mu.r$.

In order to provide an idea of the moments and forces occurring, reference is now made to a numerical example:

With a closing force F=2000 kN the pivot radius, measured as far as the separation surface of the pin and the bush, is 80 mm. The coefficient of friction between the pin and the bush, on the assumption that both elements comprise steel, is $\mu=0.1$, the frictional moment occurring is 16000 kN m, the eccentric spacing e which eliminates the frictional moment is 8 mm.

With other pairings of material and different pivot structures the coefficient of friction can be from 0.03 to 0.15, and for that reason typical spacings of the pivot axis 15 from the central plane Z are between 0.03 r and 0.15 r.

Figure 4:
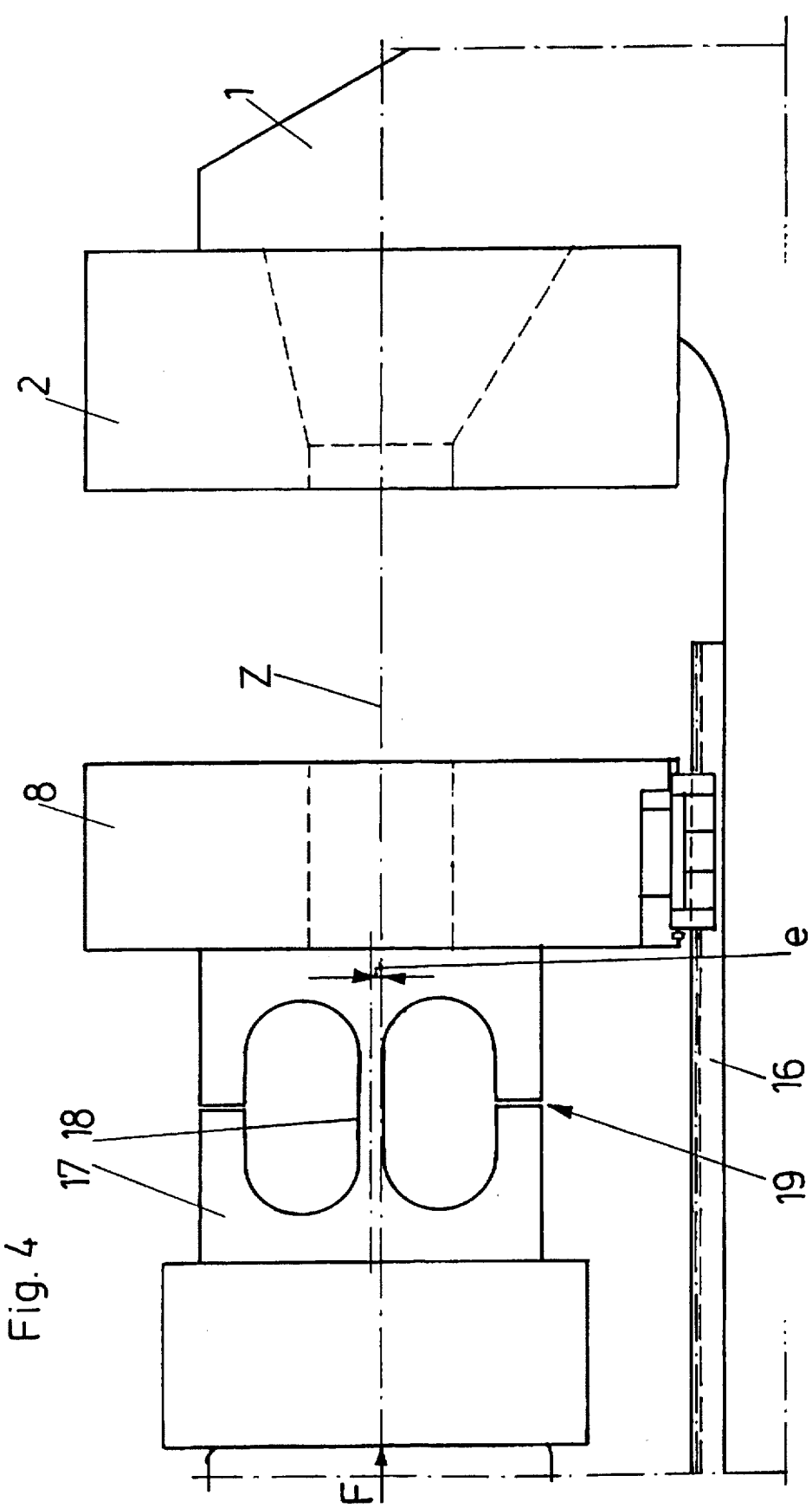
FIG. 4 shows an apparatus as illustrated in FIG. 3 with a deformable pivot member.

The apparatus shown in FIG. 4 differs from that illustrated in FIG. 3 only in that the rotary pivot is replaced by a deformable member 17. That member 17 has a central web 18 which in turn is displaced upwardly by the distance e, relative to the central plane Z of the mold, in which the closing force F is applied. When the closing force is applied that facilitates deformation of the web 18, which can be limited by a slot 19 closing.

Figure 5:
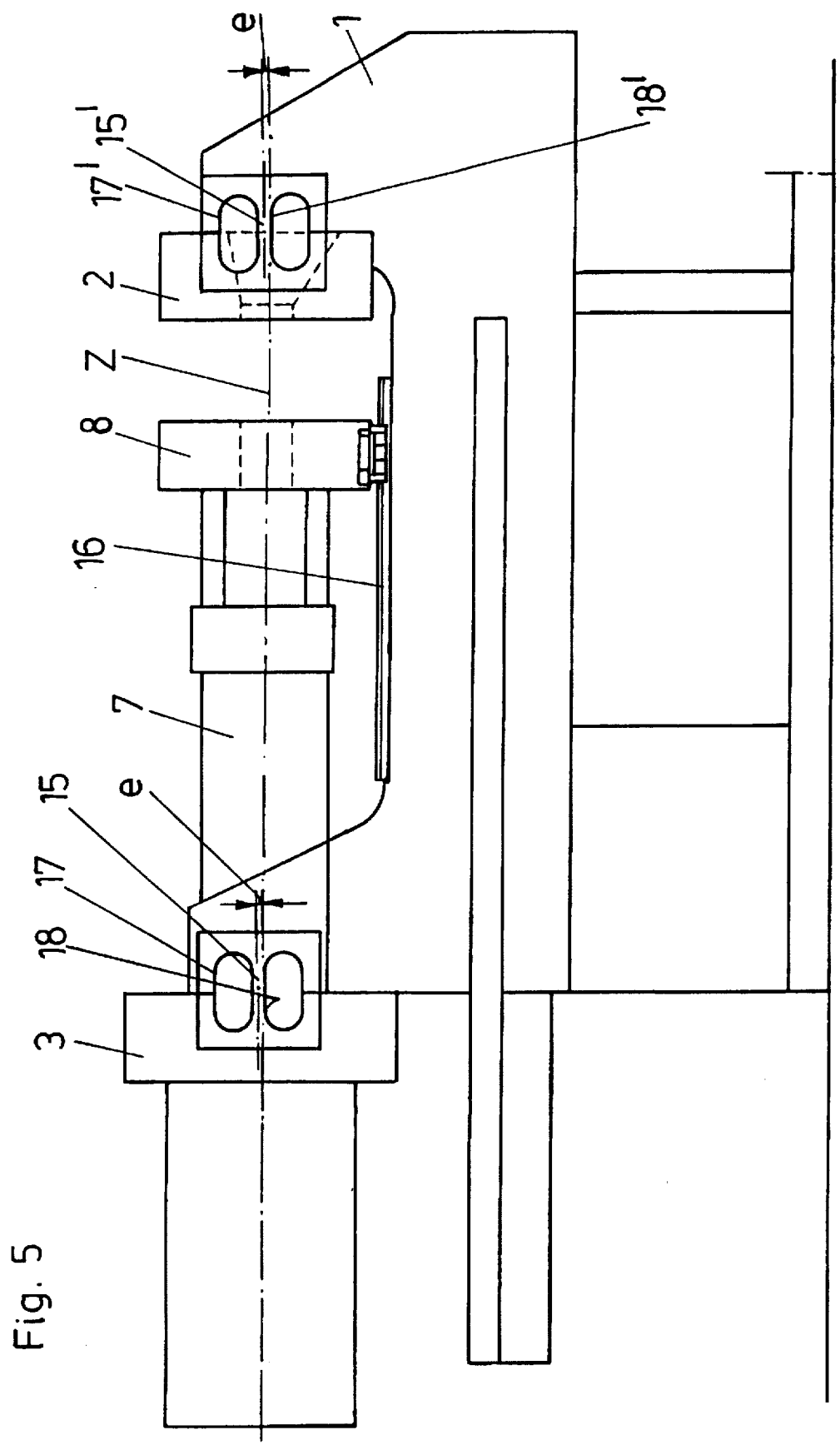
FIG. 5 shows an apparatus as shown in FIG. 1 with deformable pivot members.

The embodiment shown in FIG. 5 differs from that illustrated in FIG. 4 in that the deformable members 17, 17', for pivotal movement of the mold plates 2 and 8, are arranged in pairs, as in FIG. 1. When therefore the vertical limbs of the machine frame 1 are Inclined outwardly under the influence of the closing force which is applied centrally by way of the piston 7, the mold rounding plates 2 and 8 remain in their original position. That is made possible by the webs 18 and 18' bending. That occurs under the influence of a torque which in turn is produced by the webs 18, 18' being displaced upwardly by a distance e relative to the horizontal central plane Z in which the closing force is applied.

I claim:

1. An apparatus for injection molding plastic material, comprising:

a machine frame;

a stationary mold mounting plate having a first mold half fixed thereto, said stationary mold mounting plate being connected to said machine frame;

a moveable mold mounting plate having a second mold half fixed thereto, said moveable mold mounting plate being connected to said machine frame, said moveable mold mounting plate being moveable toward said stationary mold mounting plate for engaging said second mold half against said first mold half, said first and second mold halves defining a horizontal central plane (Z);

at least one pivot means connected between said machine frame and at least one of said mold mounting plates for pivoting said at least one mold mounting plate about a horizontal pivot axis with respect to said machine frame, said pivot means being near said horizontal central plane but being fixed at a position which is above said horizontal central plane by a displacement amount (e) which is small compared to a vertical extent of said first and second mold halves, said pivot means comprising a rotary pivot connected between said machine frame and said at least one of said mold mounting plates, said rotary pivot having a radius (r), said displacement amount (e) being smaller than one half the radius (r) of the rotary pivot.

2. An apparatus according to claim 1 wherein the displacement amount (e) is from 0.03 to 0.15 times the radius (r) of the rotary pivot.

3. An apparatus according to claim 1 wherein only said moveable mold mounting plate is connected by said pivot means to said machine frame.

* * * * *